US00RE44344E

(19) United States
(12) Reissued Patent
Fukinuki et al.

(10) Patent Number: US RE44,344 E
(45) Date of Reissued Patent: Jul. 9, 2013

(54) NAILER DEVICE

(75) Inventors: Masatoshi Fukinuki, Jiangsu (CN); Gan Wei, Jiangsu (CN); Zhiguo Chen, Jiangsu (CN); Guillaume Keller, Jiangsu (CN); Toshinari Yamaoka, Jiangsu (CN)

(73) Assignee: Chervon (HK) Limited, Wanchai (HK)

(21) Appl. No.: 13/506,854

(22) Filed: May 17, 2012

Related U.S. Patent Documents

Reissue of:
(64) Patent No.: 7,789,282
Issued: Sep. 7, 2010
Appl. No.: 12/184,392
Filed: Aug. 1, 2008

(30) Foreign Application Priority Data

Aug. 14, 2007 (CN) ..... 2007 2 0042846
Sep. 29, 2007 (CN) ..... 2007 2 0182700
Jun. 17, 2008 (CN) ..... 2008 2 0117509

(51) Int. Cl.
*B25C 5/15* (2006.01)

(52) U.S. Cl.
USPC ..... 227/131; 227/139; 173/93; 173/100; 173/117

(58) Field of Classification Search
USPC ..... 227/131, 129, 139; 173/93, 93.7, 173/90, 100, 117
See application file for complete search history.

(56) References Cited

U.S. PATENT DOCUMENTS 2,079,909 A * 5/1937 Jackson ..... 173/94
2,500,402 A * 3/1950 Craig ..... 173/94
2,877,820 A * 3/1959 Ristow ..... 173/31
3,160,217 A * 12/1964 Raihle ..... 173/94
3,376,940 A * 4/1968 Willis ..... 173/117
3,486,569 A * 12/1969 Sieber ..... 173/93.5
3,924,692 A * 12/1975 Saari ..... 173/117
4,114,699 A * 9/1978 Wolf ..... 173/109
4,299,021 A * 11/1981 Williams ..... 29/432
4,529,044 A * 7/1985 Klueber et al. ..... 173/48
4,732,217 A * 3/1988 Bleicher et al. ..... 173/104
4,742,875 A * 5/1988 Bell ..... 173/117
4,770,254 A * 9/1988 Kominami ..... 173/109
4,908,909 A * 3/1990 Akrenius ..... 452/141
5,002,134 A * 3/1991 Yamada ..... 173/94
5,002,869 A * 3/1991 Schlossman et al. ..... 435/7.24
5,025,869 A 6/1991 Terunuma
5,443,196 A * 8/1995 Burlington ..... 227/131
5,794,325 A * 8/1998 Fallandy ..... 29/566.4
6,172,472 B1 * 1/2001 Klingbeil ..... 318/244
6,213,222 B1 * 4/2001 Banach ..... 173/1
6,250,401 B1 * 6/2001 Yamada ..... 173/205
6,431,430 B1 * 8/2002 Jalbert et al. ..... 227/131
6,866,226 B2 * 3/2005 Pratt et al. ..... 244/129.4
6,959,478 B2 * 11/2005 Chen ..... 29/435
7,263,920 B1 * 9/2007 Hamilton ..... 81/466
7,306,047 B2 * 12/2007 Oda et al. ..... 173/48

FOREIGN PATENT DOCUMENTS

CN 200410088827 10/2006
WO 2006/008546 A2 1/2006

* cited by examiner

*Primary Examiner* — Scott Smith
(74) *Attorney, Agent, or Firm* — Greenberg Traurig, LLP

(57) ABSTRACT

A nailer device has a housing containing a motor and a striking device arranged in a compact manner. A transmission mechanism is mounted in the housing for translating the rotating motions of the motor into the periodic impact motions upon the striking device. The transmission mechanism includes an impact assembly which imparts the periodic impact motions upon the striking device.

32 Claims, 7 Drawing Sheets

NAILER DEVICE

Matter enclosed in heavy brackets [ ] appears in the original patent but forms no part of this reissue specification; matter printed in italics indicates the additions made by reissue.

BACKGROUND

The following generally relates to a nailer device and, more particularly, relates to an electric nailer device.

Nailer devices are commonly used portable tools. In accordance with the type of power source utilized, nailer devices can be generally divided into two types, e.g., pneumatic nailer devices and electric nailer devices. A pneumatic nailer device is operated with an air compressor attached as a power supply, which is commonly inconvenient for a user to move to different places during operation, so that the using of the pneumatic nailer device is limited in many occasions. An electric nailer device generally comprises a transmission mechanism for transmitting rotating motions of a motor into linear movements of an impact rod arranged in a nozzle. When a switch on the nailer device is turned on, electric power energy is thus converted into mechanical energy of reciprocating motions.

Both U.S. Pat. No. 6,431,430 and PCT Publication No. WO2006/008546 disclose a kind of electric nailer device powered by a battery pack. The disclosed nailer device comprises a crank-slider transmission mechanism for transferring rotating motions of a motor into linear motions. However, one disadvantage of this kind of nailer device is that the crank-slider transmission mechanism substantially performs push actions and the nailing efficiency of such push actions is much lower than that of strike actions when the nailer device is provided with the same motor power. Another disadvantage is that the push power of the pushing rod driven by the crank-slider transmission mechanism is a constant, so when the nail meets a hard object, the resistance force caused thereby may cause the rotor of the motor to stop subjecting the motor to possible damage. A further disadvantage is that the motor is arranged in front of or behind the handle so that the connection between the motor and the transmission mechanism takes a lot of space which makes the nailer device relatively larger and inconvenient for a user to carry.

Yet further, Chinese Patent Application No. 200410088827.9 discloses a nailer device comprising a transmission mechanism which transfers rotational power of a motor to provide a compression force to a spring whereupon the spring is released through a release means to produce an impact force. This nailer device can carry out a single-strike action under the spring force, but not a continuous strike action, so the work efficiency is still relatively low, which results in the nailer device not gaining acceptance as a commonly used tool. Otherwise, the motor is arranged below the head of the housing, which is apart from the handle, so the structure of the nailer device is not compact.

SUMMARY

The following describes an improved electric nailer device which can carry out continuous strike actions. To this end, the nailer device comprises a housing containing a motor therein and a striking device. A transmission mechanism is mounted in the housing which transfers rotating motions of the motor into periodic impact motions of the striking device. The transmission mechanism comprises an impact assembly which impacts the striking device periodically.

The striking device may comprise a striking portion which can contact a head of a nail to be stricken and an impacted portion which can be contacted with the impact assembly.

The striking device may comprise a reciprocating member which can be moved in a reciprocating manner relative the housing.

The impact assembly may comprise a rotary impact member having a rotating axis.

The rotary impact member may comprise at least an impact part which can contact the impacted portion of the striking device periodically.

As will become apparent, the rotating motions of the motor are converted within the subject nailer into reciprocating striking movements of the striking device with the aid of a restoring device. Thus, while the motor continues rotating, the rotating motions of the motor are converted into periodic impact actions of the impact assembly through the transmission mechanism allowing the striking device to be driven with reciprocating movements to continuously strike the nail. The subject nailer also provides a relatively more compact structure and can carry out efficient and continuous strike actions, which overcomes the disadvantages of a single-strike or shoot-type nailer device of the prior art. Compared with this prior art, the subject nailer device is substantially different and improved so that the nailer device can be applied in different work occasions.

A better appreciation of the objects, advantages, features, properties, and relationships of the electric nailer disclosed hereinafter will be obtained from the following detailed description and accompanying drawings which set forth illustrative embodiments which are indicative of the various ways in which the principles described hereinafter may be employed.

BRIEF DESCRIPTION OF THE DRAWINGS

For use in better understanding the subject electric nailer reference may be had to the following drawings in which.

DETAILED DESCRIPTION

Figure 1:
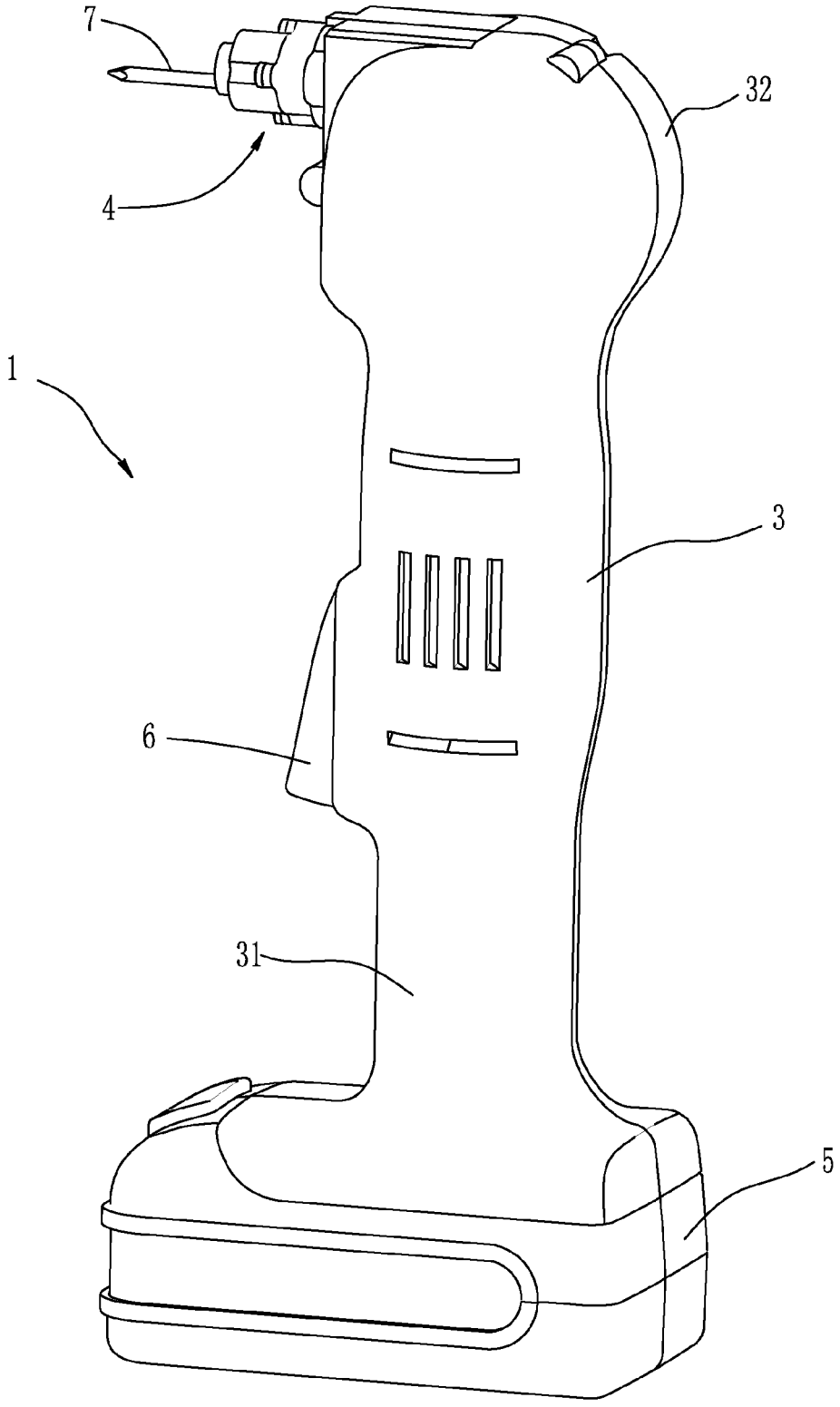
FIG. 1 is a perspective view of a first exemplary embodiment of an electric nailer device constructed according to the present invention.
Figure 2:
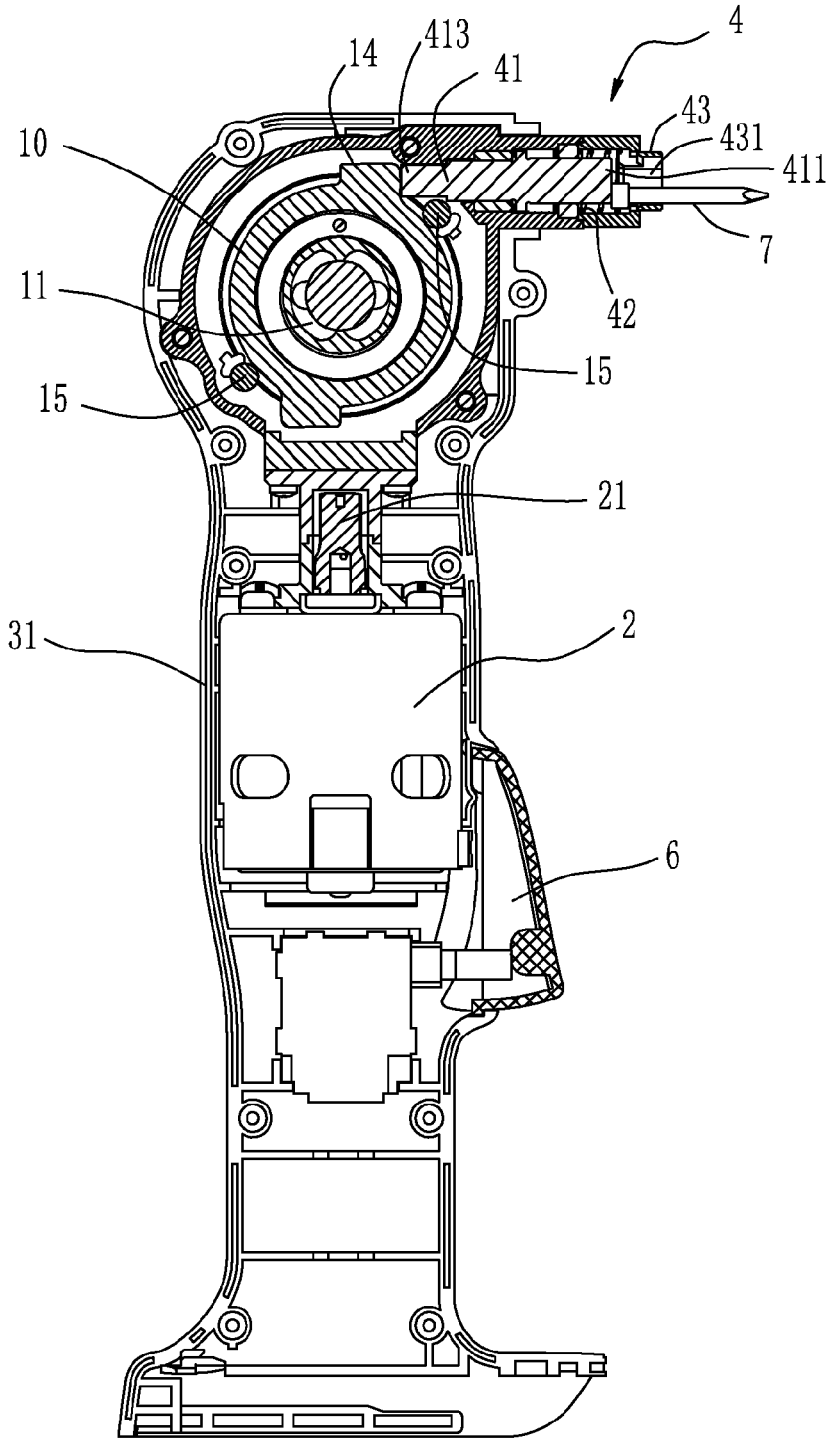
FIG. 2 is a cutaway view of the nailer device of FIG. 1 taken along a combination surface of the two half housings, wherein a battery of the nailer device is removed for clarity.
Figure 3:
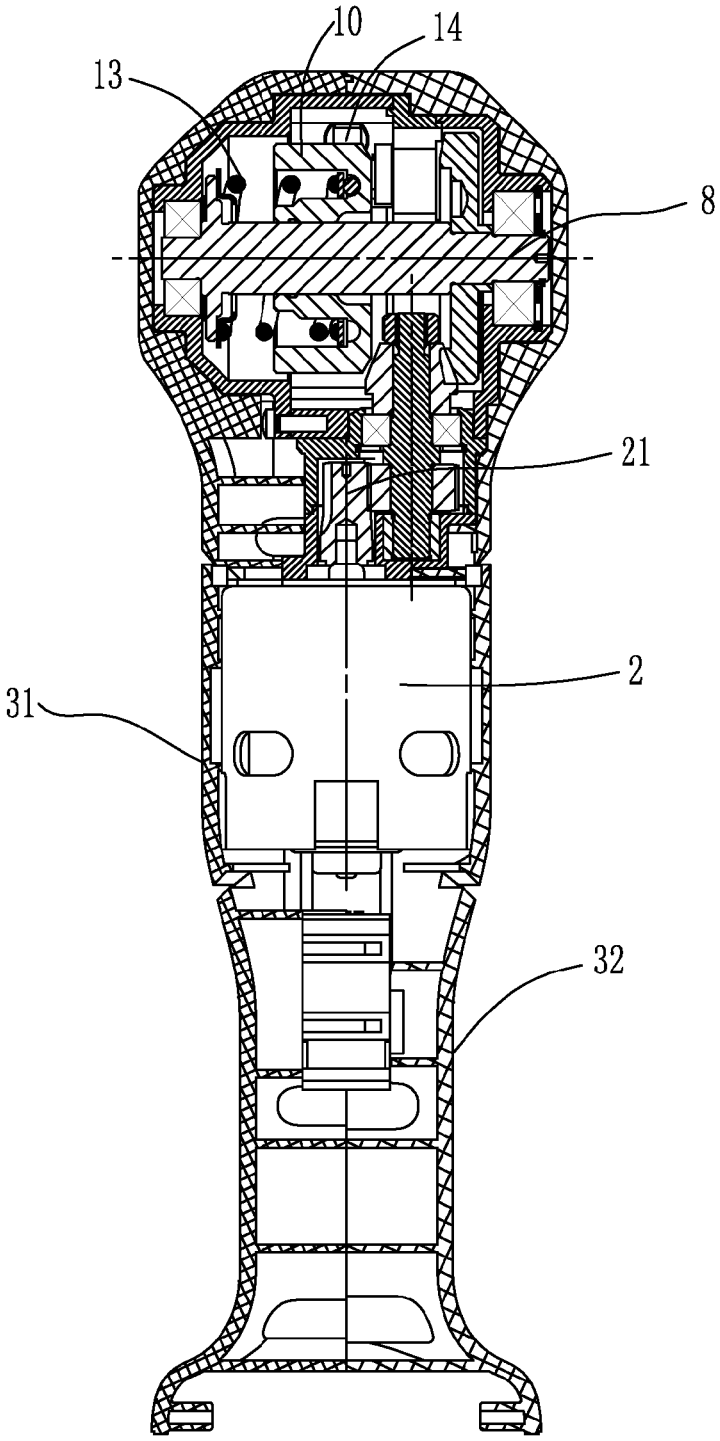
FIG. 3 is a cutaway view of the nailer device of FIG. 1 taken along the surface which is perpendicular to the combination surface of the two half housings, wherein the battery of the nailer device is removed for clarity.

With reference to FIGS. 1 and 2, a nailer device 1 of a first exemplary embodiment comprises a housing 3 containing a motor 2 and having a nozzle portion 4. The housing 3 is composed with a first half housing 31 and a second half housing 32, both of which form a chamber. An elongate grip is formed on a main body of the housing 3. An upper portion of the housing 3 comprises a hole. At least a part of the nozzle portion 4 is extended outward from the hole.

The nailer device 1 comprises a battery pack 5 for powering the motor 2. However, the nailer device 1 need not be restricted to the use of a DC power supply and may be equally powered by a source of AC power. A switch 6 is arranged on the housing 3 for controlling the motor 2. The nozzle portion 4 includes a striking rod 41 mounted therein through a restoring spring 42 for striking a nail 7. The striking rod 41 is disposed substantially perpendicular to the main body of the housing 3 and is moved in a reciprocating manner within the nozzle portion 4. The striking rod 41 includes a first end 411 and a second end 413. During operation, the striking rod 41 is driven to move and the first end 411 acts on a head of the nail 7. The nozzle portion 4 further includes a retractable nail containing device 43 which is provided with an opening 431 for containing at least the head of the nail. By way of example, a magnet, which is not shown in the drawings, may be included in the nail containing device 43 for attaching the nail 7 in the opening 431. The diameter of the opening 431 is bigger than the nails commercially used so nails with different shapes and sizes can be placed therein.

With reference to FIGS. 3-7, a transmission mechanism is arranged in the housing 3 for converting rotating motions of the motor 2 into impact motions of the striking rod 41. The motor 2 includes a motor shaft 21, an axis of which is located on or parallel to a longitudinal direction of the main body of the housing 3. The motor shaft 21 is connected with a multi-stage gear transmission mechanism including bevel gears. In this way, the rotation power of the motor 2 is transmitted to a rotating shaft 8 which is mounted in the upper portion of the housing 3 by two bearings. A pair of inclined slots 9, each of which is generally V-shaped, is formed on the rotating shaft 8. An impact wheel 10, which is preferably a hollow cylinder, is mounted on the rotating shaft 8. The impact wheel 10 comprises a pair of arcuate guiding slots 11 which are formed on its inner wall and opposite to the inclined slots 9 respectively. The open direction of each arcuate guiding slot 11 is reversed to that of each V-shaped slot 9. Both the inclined slots 9 and the guiding slots 11 are formed as half-circular recesses. A pair of steel balls 12 is arranged movably in two chambers formed by the inclined slots 9 and the guiding slots 11. When the inclined slots 9 are moved relative to the guiding slots 11, the chambers formed thereby are moved with a result that the steel balls 12 can be moved along with the chambers. The impact wheel 10 can thus be driven to rotate through the steel balls 12 pressing the guiding slots 11 when the rotating shaft 8 is rotated. An energy storing spring 13 is mounted between the impact wheel 10 and the rotating shaft 8 in manner so that an end of the energy storing spring 13 abuts to a shoulder 81 of the rotating shaft 8 an other end of the energy storing spring abuts to a side surface of the impact wheel 10. Under an axial biasing force of the energy storing spring 13 acting upon the shoulder 81 and the impact wheel 10, as the solid lines show in FIG. 7, the steel balls 12 are located at top ends of the V-shaped slots 9 and bottom ends of the guiding slots 11 when the rotating shaft 8 and the impact wheel 10 are action less or rotated with no load. In this state, the impact wheel 10 is at a first axial position relative to the rotating shaft 8.

Figure 4:
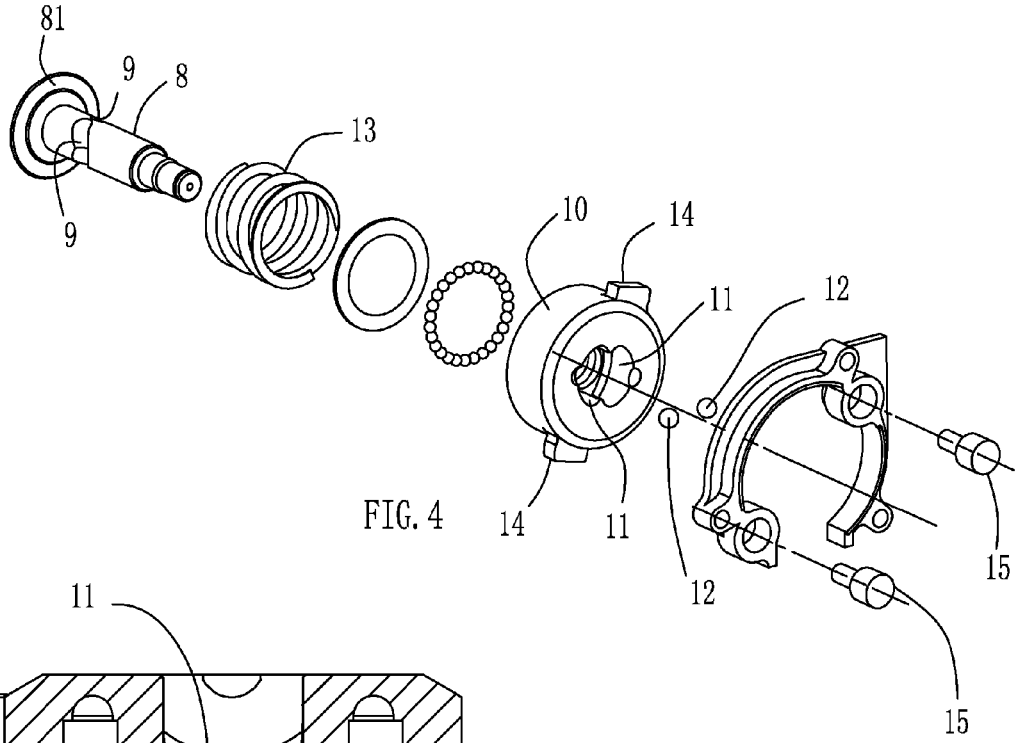
FIG. 4 is a partial exploded view of a transmission mechanism of the nailer device of FIG. 1.
Figure 5:
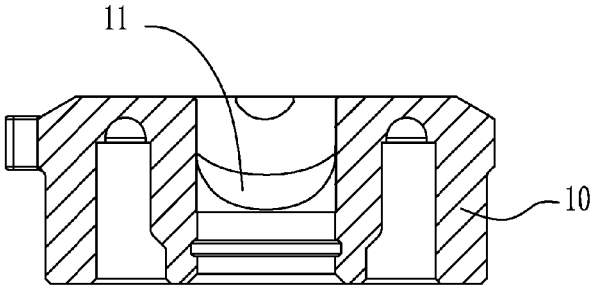
FIG. 5 is a sectional view of an impact wheel of the nailer device of FIG. 1.
Figure 7:
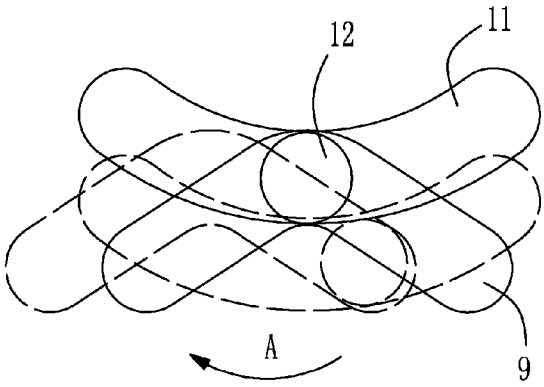
FIG. 7 is a schematic view showing two movement states of a steel ball, a guiding slot on the inner wall of the impact wheel, and an inclined slot of the rotating shaft of the nailer device of FIG. 1.
Figure 6:
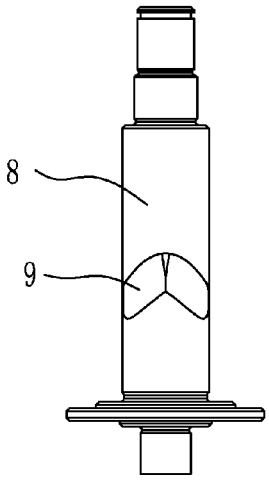
FIG. 6 is a front view of a rotating shaft of the nailer device of FIG. 1.

With reference to FIGS. 2 and 4, a pair of stop pins 15 is fixed in the housing 3, which is adjacent to a periphery of the impact wheel 10. Preferably, a pair of projections 14, which are extended along the diameter direction of the rotating wheel 10, is provided on the periphery of the rotating wheel. When the switch 6 is turned on, the motor 2 is powered to rotate to drive the rotating shaft 8 through the multi-stage gear transmission and the impact wheel 10 is rotated together with the rotating shaft 8 under the cooperation of the inclined slots 9, the guiding slots 11, the steel balls 12, and the energy storing spring 13. When the impact wheel 10 is rotated to a position where the projections 14 contact the stop pins 15, the impact wheel 10 is provisionally stopped from rotating by the stop pins 15, while the locations of the guiding slot 11 of the impact wheel 10, the steel ball 12 and the inclined slot 9 are indicated with the solid lines in FIG. 7. As the rotating shaft 8 is driven to continue rotating, each of the inclined slots 9 is rotated thereby along a direction indicated with an arrow A to a location indicated with dotted lines in FIG. 7 so that each corresponding steel ball 12 is pressed to move along with the inclined slot 9 toward the top end of the V-shaped 5 slot. Accordingly, the impact wheel 10 is pushed to move along its axis to a second axial position and presses the energy storing spring 13 thereby, while the locations of the guiding slot 11 of the impact wheel 10, the steel ball 12, and the inclined slot 9 are indicated with the dotted lines in FIG. 7. Obviously, the impact wheel 10 has a certain rotation lag relative to the rotating shaft 8 during displacement. At the second axial position, the projections 1410 depart from the stop pins 15, so that the rotating of the impact wheel 10 can not be stopped by the stop pins 15 any more. Under a function of rebound force of the energy storing spring 13, the impact wheel 10 is pressed back to its first axial position quickly. With the cooperation of the inclined slots 9, the guiding slots 11, and the steel balls 12, the impact wheel 10 is driven to rotate by the rotating shaft 8 again. In this reposition process, which is 15 reversed to the above displacement process, the impact wheel 10 has a certain rotation excess relative to the rotating shaft 8, so it rotates at a higher speed than the rotating shaft 8 in this reposition process. For improving the nailing efficiency, the strength of the energy storing spring is preferably suited with the rotating speed of the motor, so that the projections will impact the striking rod after the impact wheel is substantially back to its original position, 20 e.g., the first axial position. As a result, a second end 413 of the striking rod 41 is impacted by the projections 14 of the impact wheel 10 to move at a high speed in a direction away from the projections 14 and a first end 411 of the striking rod 41 strikes the head of the nail 7 quickly. In this way, a repeating strike action is achieved. When the projections 14 are continuously driven to rotate to contact the stop pins 15, the impact wheel 10 is stopped rotating again to enter into succeeding cycles. While the striking rod 41 is moved to drive the nail 7, the restoring spring 42 is compressed. When the strike action is finished, the striking rod 41 is returned back to its original position under the rebound force of the restoring spring 42.

As illustrated, the rotating shaft 8 and the impact wheel 10 have the same rotating axis. When the projections 14 impact the second end 413 of the striking rod 41, the direction of the impact force is perpendicular to the rotating axis of the impact wheel 10. Preferably, the normal directions of contacting surfaces of the second end 413 and the projections 14 are perpendicular to the rotating axis of the impact wheel 10.

In this exemplary embodiment, the V-shaped slots 9, each of which consists of a recess inclined in two directions, and the arcuate guiding slots 11, the open directions of which are reversed to the open directions of the V-shaped slots 9, are preferably selected to cooperate with each other. However, since during the operation only one side of the V-shaped slot is functioning, the inclined slot can be provided with a recess only inclined in one direction with the strike action still being achievable.

In the first described exemplary embodiment, the striking device which contacts the nail directly is the rod 41 which is elongated. It will be appreciated, however, that the striking device may also be substituted with other component with different shapes and structures to achieve the same result. Similarly, the projections on the impact wheel may be provided on other positions of the impact wheel as long as the contacting part of the projection and the rod is departed from the axis of the impact wheel. For example, the projection may be positioned on a side of the impact wheel. Still further, the impact wheel may be substituted with other impact members with different shapes and structures. For example, the impact member may be a rod shape, which is mounted on the rotating shaft through a hole while at least an end of the impact member functions as the projections of the impact wheel.

In the illustrated, exemplary embodiment the striking rod 41 is pressed toward the inside of the housing under the biasing force produced by the restoring spring 42. In this manner, the rod 41 is impacted by the impact wheel 10 as soon as the nailer device is turned on. In an alternative embodiment, a spring or other restoring device may be arranged to produce a force that acts on the striking device toward the outside of the housing so that the impact member will not contact with the rod when there is no force toward the inside of the housing that acts on the striking device. Thereby it will decrease abrasion between the impact device and the striking device when the nailer device is operated with no load, and the service life is extended. In other embodiments, a friction member may be mounted between the striking device and other parts of the nozzle (for example: a rubber seal ring or an appropriate shaped rubber member) so that when there is no force acting upon the striking device, the striking device can be held at the present location relative to the other parts of the nozzle, which also can reduce the abrasion between the impact device and the striking device.

The stop pins of the nailer device in the first exemplary embodiment can be removed, and the detailed reason of which will be described in the following second exemplary embodiment.

Figure 8:
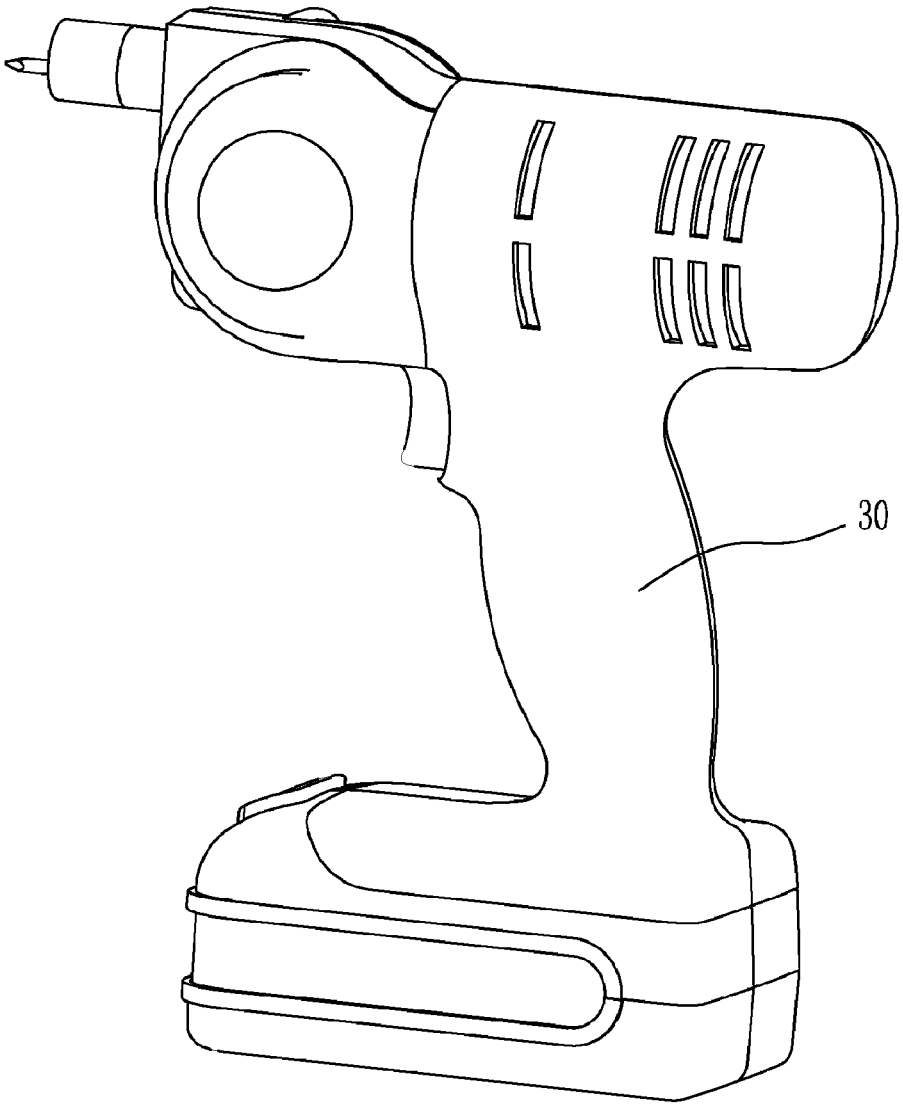
FIG. 8 is a perspective view of a second exemplary embodiment of an electric nailer device constructed according to the present invention.
Figure 9:
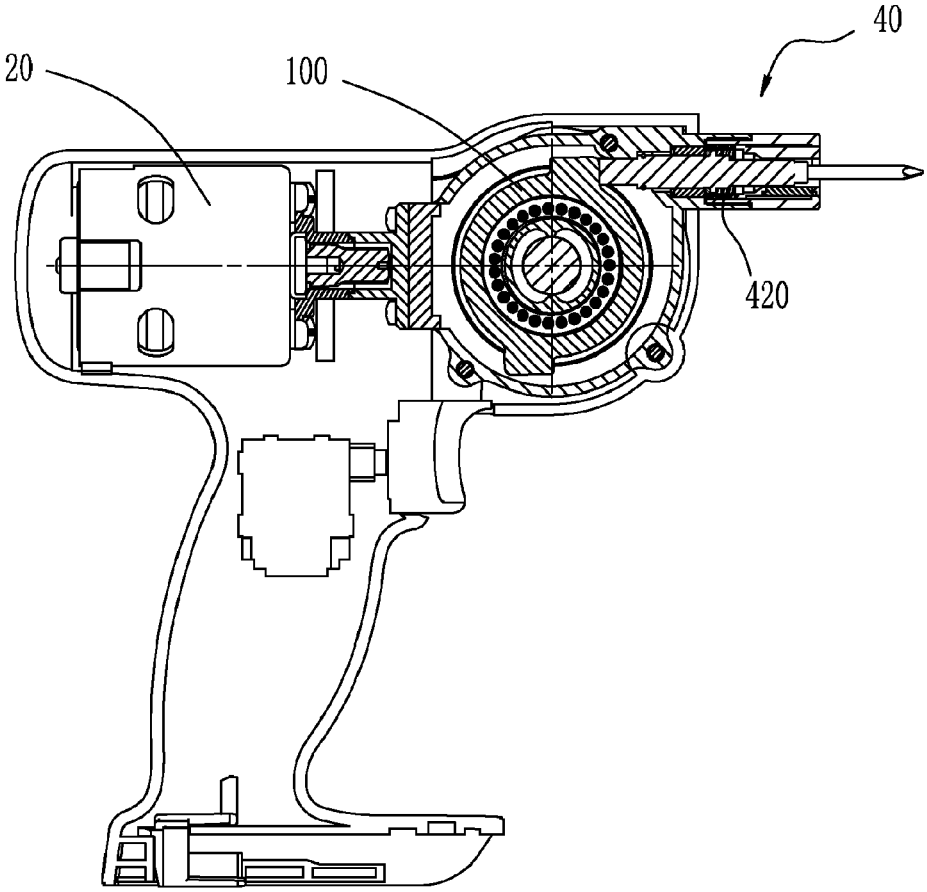
FIG. 9 is a cutaway view of the nailer device of FIG. 8 taken along the combination surface of the two half housings, wherein the battery of the nailer device is removed for clarity.
Figure 10:
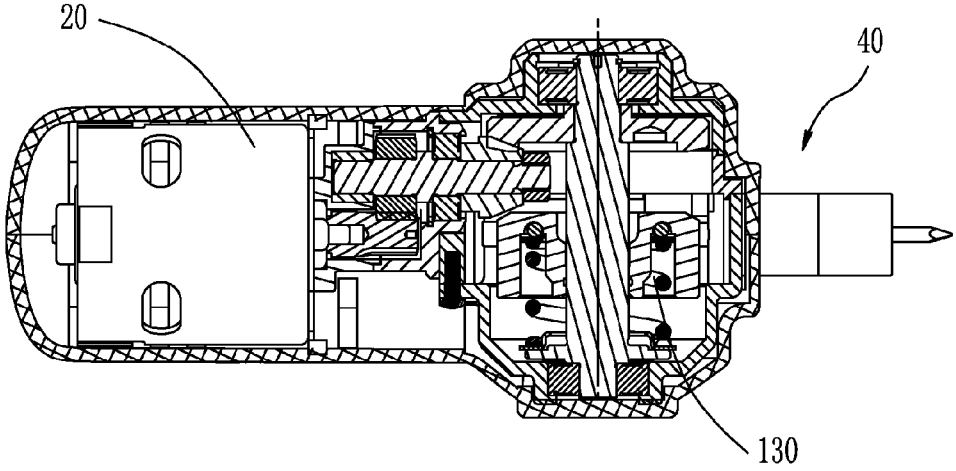
FIG. 10 is a cutaway view of the nailer device of FIG. 8 taken along the surface which is perpendicular to the combination surface of the two half housings, wherein the battery of the nailer device is removed for clarity.

With reference to FIGS. 8-10, a second exemplary embodiment of a nailer device according to the present invention is shown. The appearances of the first and second embodiments are obviously different from each other. A housing 30 of the nailer device in the second embodiment is substantially T-shaped when the battery pack is removed, and a motor 20 is arranged horizontally in the housing 30 and behind a nozzle 40. However, a transmission mechanism and the principle utilized in the nailer device in the second exemplary embodiment are similar to that in the first embodiment and, as such, need not be described in detail herein.

Besides the shape differences of several components, a distinct difference between the first and the second exemplary embodiments is that the nailer device in the second embodiment does not comprise any stop pins. During operation, when a nail is being struck into a harder material or the nail has been struck into the material, the striking rod may bear a higher resistance with a result that the rod will stop moving in a status that a maximum stroke of the rod is not reached. Meanwhile an end of the striking rod, which is to be contacted with an impact wheel, effectively functions as a stop pin to force the impact wheel to move axially to compress an energy storing spring toward a second axial position under the cooperation of slots and engaging members (for example steel balls). Once the impact wheel is moved to arrive at the second axial position where the impact wheel does not contact the striking rod, an elastic potential energy of the energy storing spring is released so that the impact wheel is forced to rotate at a speed higher than a normal rotating speed under the cooperation of the slots and the engaging member. With the aid of the rotating potential energy, the impact wheel impacts the striking rod strongly and effectively again.

So in the case of absence of the stop pins, the striking device functions as a stop pin as long as the resistance exceeds a certain scope. While a rotating shaft of the nailer device is rotated uniformly, the impact device is rotated at a speed varying periodically, which is alternately suspended and rotated at a high speed. Then the striking device is impacted periodically by the impact device. Thus, it will be understood that the stop pins of the nailer device in the first exemplary embodiment can be removed.

Springs 130, 420 in the second exemplary embodiment and the springs 13, 42 in the first exemplary embodiment may be substituted with other biasing members or other means for producing attraction force or exclusion force, for example, magnetic members.

The impact wheel 100 in the second exemplary embodiment and the impact wheel 10 in the first exemplary embodiment may be substituted with a piston, a centrifugal member, or a spring to impact the striking rod.

In the first and second exemplary embodiments, the impact device is driven to impact the striking device periodically, and the striking device is moved in a reciprocating linear manner. However, those of ordinary skill in the art may easily understand that the striking device may be substituted with a lever mechanism, an end of which is impacted by the impact device to pivot about a pivotal axis, and the other end of which can strike the nail. In this occasion, the striking device is reciprocating oscillated under the periodic impacts of the impact device.

From these described various alternatives, it will be understood that the present invention is not restricted as to the particular embodiments illustrated and disclosed hereinabove. Accordingly, any substitutes and modifications according to the spirit of the present invention will be regarded as falling within the range of the present invention.

What is claimed is:

1. A nailer device, comprising:

a housing containing a motor;

a striking device having a striking portion for striking a nail and an impacted portion for receiving periodic impact motions; and a transmission mechanism mounted in the housing which translates rotating motions of the motor into the periodic impact motions upon the impacted portion of the striking device;

wherein the transmission mechanism comprises an impact assembly which imparts the periodic impact motions upon the striking device, wherein the impact assembly comprises a rotating shaft driven by the motor and a rotary member mounted on the rotating shaft rotatable about a rotary axis and having at least one impact part which periodically contacts the impacted portion of the striking device, wherein two recesses extending in two reversed directions are respectively formed on the rotating shaft and the rotary member, wherein an engaging member is arranged in the two recesses, and wherein an energy storing device is mounted between the rotating shaft and the rotary member.

2. The nailer device of claim 1, comprising a DC battery pack detachably mounted to a lower end of the housing for providing power to the motor and a power switch mounted on a grip portion of the housing for controlling power provided to the motor from the DC battery pack.

3. The nailer device of claim 1, wherein the housing comprises a nozzle and at least a part of the striking device is disposed within the nozzle.

4. The nailer device of claim 3, wherein the nozzle has a nail containing opening for containing at least the head of the nail to be struck.

5. The nailer device of claim 4, wherein the nail containing opening has an associated magnetic member for holding the head of the nail to be struck.

6. The nailer device of claim 1, wherein the transmission mechanism comprises gear transmission parts whereby rotating motions of the motor are translated into rotation motions of the impact assembly through a right angle.

7. The nailer device of claim 1, wherein, when the impact part of the rotary impact member contacts the impacted portion of the striking device an impact force is provided by the impact part onto the impacted portion of the striking device in a direction perpendicular to the rotary axis.

8. The nailer device of claim 1, wherein, when the impact part of the rotary member impacts the impacted portion of the striking device, the striking device moves in a direction perpendicular to the rotary axis.

9. The nailer device of claim 1, wherein, when the impact part of the rotary member impacts the impacted portion of the striking device, normal lines of contacting surfaces of the impacted portion of the striking device and the impact part are perpendicular to the rotary axis.

10. The nailer device of claim 1, wherein the rotary member is moveable between a first axial position and a second axial position relative to the rotating shaft whereby, when the rotary member is at the first axial position, the impacted portion of the striking device is contactable with the impact part at a predetermined position on a rotating circle followed by the impact part of the rotary member and the energy storing device is in an energy-releasing state and, when the rotary impact member is at the second axial position, the impact part contacts the impacted portion of the striking device and is at least temporarily stopped from following the rotating circle and the energy storing device is in an energy-storing state.

11. The nailer device of claim 1, comprising at least one stopper fixed in the housing and located on a rotating circle followed by the impact part of the rotary member and the rotary member is moveable between a first axial position and a second axial position relative to the rotating shaft whereby, when the rotary member is at the first axial position, the impacted portion of the striking device is contactable with the impact part at a predetermined position on the rotating circle followed by the impact part of the rotary member and the energy scoring device is in an energy-releasing state and, when the rotary impact member is at the second axial position, the impact part is at least temporarily stopped from following the rotating circle and the energy storing device is in an energy-storing state.

12. A nailer device, comprising:

a housing containing a motor;

a striking device having a striking portion for striking a nail and an impacted portion for receiving periodic impact motions; and a transmission mechanism mounted in the housing which translates rotating motions of the motor into the periodic impact motions upon the impacted portion of the striking device;

wherein the transmission mechanism comprises an impact assembly which imparts the periodic impact motions upon the striking device, wherein the impact assembly comprises a rotary member rotatable about a rotary shaft driven by the motor and having at least one impact part which periodically contacts the impacted portion of the striking device, a pair of inclined recesses, each of which is V-shaped, formed on the rotary shaft, and a pair of arcuate guiding recesses, each of which faces one recess of the pair of inclined recesses formed on an internal cylindrical surface of the rotary member, and wherein an open direction of the arcuate guiding recesses is reversed to that of the inclined recesses.

13. The nailer device of claim 12, wherein, when the impact part of the rotary member contacts the impacted portion of the striking device an impact force is provided by the impact part onto the impacted portion of the striking device in a direction perpendicular to the rotary axis.

14. The nailer device of claim 12, wherein, when the impact part of the rotary member impacts the impacted portion of the striking device, the striking device moves in a direction perpendicular to the rotary axis.

15. The nailer device of claim 12, wherein, when the impact part of the rotary member impacts the impacted portion of the striking device, normal lines of contacting surfaces of the impacted portion of the striking device and the impact part are perpendicular to the rotary axis.

16. The nailer device of claim 12, comprising a DC battery pack detachably mounted to a lower end of the housing for providing power to the motor and a power switch mounted on a grip portion of the housing for controlling power provided to the motor from the DC battery pack.

17. The nailer device of claim 12, wherein the housing comprises a nozzle and at least a part of the striking device is disposed within the nozzle.

18. The nailer device of claim 17, wherein the nozzle has a nail containing opening for containing at least the head of the nail to be struck.

19. The nailer device of claim 18, wherein the nail containing opening has an associated magnetic member for holding the head of the nail to be struck.

20. The nailer device of claim 12, wherein the transmission mechanism comprises gear transmission parts whereby rotating motions of the motor are translated into rotation motions of the impact assembly through a right angle.

21. A nailer device, comprising:

a housing containing a motor;

a striking device having a striking portion for striking a nail and an impacted portion for receiving periodic impact motions; and a transmission mechanism mounted in the housing which translates rotating motions of the motor into the periodic impact motions upon the impacted portion of the striking device;

wherein the transmission mechanism comprises an impact assembly which imparts the periodic impact motions upon the striking device, wherein the impact assembly comprises a rotary member rotatable about a rotary shaft driven by the motor and having at least one impact part which periodically contacts the impacted portion of the striking device, a pair of inclined recesses, each of which is V-shaped, formed on the rotary shaft, and a pair of guiding recesses, each of which faces one recess of the pair of inclined recesses formed on the rotary member, and wherein an open direction of the guiding recesses is reversed to that of at least a portion of the inclined recesses.

22. The nailer device of claim 21, wherein, when the impact part of the rotary member contacts the impacted portion of the striking device an impact force is provided by the impact part onto the impacted portion of the striking device in a direction perpendicular to the rotary axis.

23. The nailer device of claim 21, wherein, when the impact part of the rotary member impacts the impacted portion of the striking device, the striking device moves in a direction perpendicular to the rotary axis.

24. The nailer device of claim 21, wherein, when the impact part of the rotary member impacts the impacted portion of the striking device, normal lines of contacting surfaces of the impacted portion of the striking device and the impact part are perpendicular to the rotary axis.

25. The nailer device of claim 21, comprising a DC battery pack detachably mounted to a lower end of the housing for providing power to the motor and a power switch mounted on a grip portion of the housing for controlling power provided to the motor from the DC battery pack.

26. The nailer device of claim 21, wherein the housing comprises a nozzle and at least a part of the striking device is disposed within the nozzle.

27. The nailer device of claim 26, wherein the nozzle has a nail containing opening for containing at least the head of the nail to be struck.

28. The nailer device of claim 27, wherein the nail containing opening has an associated magnetic member for holding the head of the nail to be struck.

29. The nailer device of claim 21, wherein the transmission mechanism comprises gear transmission parts whereby rotating motions of the motor are translated into rotation motions of the impact assembly through a right angle.

30. The nailer device of claim 21, wherein the motor has a motor shaft having a rotational axis disposed in a direction that is transverse to a direction of movement of the striking device.

31. The nailer device of claim 21, wherein the motor has a motor shaft having a rotational axis disposed in a direction that is perpendicular to a direction of movement of the striking device.

32. The nailer device of claim 21, wherein the motor has a motor shaft having a rotational axis disposed in a direction that is aligned with a direction of movement of the striking device.

* * * * *